United States Patent
Sullivan et al.

(10) Patent No.: US 8,869,200 B2
(45) Date of Patent: Oct. 21, 2014

(54) SELECTION LIST OF THUMBNAILS

(75) Inventors: Marc Sullivan, Austin, TX (US); Jeff Brandt, Cedar Park, TX (US); Alyssa Williams, Elmhurst, IL (US); Brett Anderson, Fair Oaks Ranch, TX (US); James Cansler, Pflugerville, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 667 days.

(21) Appl. No.: 11/354,546

(22) Filed: Feb. 14, 2006

(65) Prior Publication Data

US 2007/0192791 A1 Aug. 16, 2007

(51) Int. Cl.
| | |
|---|---|
| *G06F 3/00* | (2006.01) |
| *H04H 60/32* | (2008.01) |
| *H04N 21/434* | (2011.01) |
| *H04N 5/50* | (2006.01) |
| *H04N 21/422* | (2011.01) |
| *H04N 21/482* | (2011.01) |
| *H04N 21/431* | (2011.01) |
| *H04N 21/47* | (2011.01) |

(52) U.S. Cl.
CPC .............. *H04N 5/50* (2013.01); *H04N 21/4345* (2013.01); *H04N 21/42204* (2013.01); *H04N 21/482* (2013.01); *H04N 21/4316* (2013.01); *H04N 21/47* (2013.01)
USPC .................... 725/38; 725/39; 725/41; 725/14

(58) Field of Classification Search
None
See application file for complete search history.

(56) References Cited

U.S. PATENT DOCUMENTS

| | | | | |
|---|---|---|---|---|
| 5,652,849 | A * | 7/1997 | Conway et al. | 715/719 |
| 5,963,204 | A * | 10/1999 | Ikeda et al. | 715/723 |
| 6,115,080 | A * | 9/2000 | Reitmeier | 348/731 |
| 6,281,940 | B1 * | 8/2001 | Sciammarella | 348/564 |
| 6,384,869 | B1 * | 5/2002 | Sciammarella et al. | 348/564 |
| 6,690,391 | B1 * | 2/2004 | Proehl et al. | 715/720 |
| 7,096,486 | B1 * | 8/2006 | Ukai et al. | 725/58 |
| 2002/0056098 | A1 * | 5/2002 | White | 725/39 |
| 2002/0080276 | A1 * | 6/2002 | Mori et al. | 348/553 |
| 2003/0014752 | A1 * | 1/2003 | Zaslavsky et al. | 725/40 |
| 2003/0084448 | A1 * | 5/2003 | Soundararajan | 725/46 |
| 2003/0088870 | A1 | 5/2003 | Wang | |
| 2003/0220100 | A1 | 11/2003 | McElhatten et al. | |
| 2004/0056883 | A1 * | 3/2004 | Wierowski | 345/719 |
| 2005/0021609 | A1 * | 1/2005 | Houghton et al. | 709/203 |
| 2005/0097606 | A1 | 5/2005 | Scott, III et al. | |
| 2005/0204385 | A1 * | 9/2005 | Sull et al. | 725/45 |

(Continued)

FOREIGN PATENT DOCUMENTS

| | | |
|---|---|---|
| WO | WO-2007111790 A2 | 10/2007 |
| WO | WO-2007111790 A3 | 10/2007 |

OTHER PUBLICATIONS

"International Application Serial No. PCT/US2007/003707, International Search Report mailed Jun. 12, 2008", 4 pgs.

(Continued)

*Primary Examiner* — Jason K Lin
(74) *Attorney, Agent, or Firm* — Guntin & Gust, PLC; Joseph Hrulka (57) ABSTRACT

A method and system to view a selection of thumbnails are described herein. A plurality of content channels, which are most recently tuned into by a user, are stored. Further, a display presents a selection array for a plurality of thumbnails that represent the plurality of content channels.

18 Claims, 5 Drawing Sheets

(56) References Cited

U.S. PATENT DOCUMENTS

| | | |
|---|---|---|
| 2005/0235312 A1 | 10/2005 | Karaoguz et al. |
| 2005/0235318 A1* | 10/2005 | Grauch et al. ................... 725/46 |
| 2006/0064719 A1* | 3/2006 | Youden ........................... 725/38 |
| 2006/0123449 A1* | 6/2006 | Ma et al. ......................... 725/58 |
| 2006/0200842 A1* | 9/2006 | Chapman et al. ............... 725/34 |
| 2006/0238625 A1* | 10/2006 | Sasaki et al. ............... 348/231.3 |
| 2006/0282852 A1* | 12/2006 | Purpura et al. ................. 725/39 |
| 2007/0079330 A1* | 4/2007 | Ludvig et al. ................... 725/38 |
| 2007/0083911 A1* | 4/2007 | Madden et al. ............... 725/135 |
| 2009/0037957 A1* | 2/2009 | Kendall et al. ................. 725/44 |

OTHER PUBLICATIONS

"International Application Serial No. PCT/US2007/003707, Written Opinion mailed Jun. 12, 2008", 6 pgs.

* cited by examiner

SELECTION LIST OF THUMBNAILS

FIELD

The application relates generally to multimedia processing, and more particularly to viewing a selection list of thumbnails representing content channels most recently tuned into.

BACKGROUND

Often television viewers do not have flexibility with regard to an order in which channels are presented. To switch between channels, viewers use channel up/down buttons and/or use a keypad to select particular channels. A "last channel" or "recent" button on a remote control offers to return the television to a most recently viewed, previous channel. If the button is hit twice, the display returns to the currently selected channel. The viewer is thus permitted to toggle between two channels very rapidly.

Television viewers often move between more than two channels on their television sets because there may be multiple programs of interest that are being broadcast at the same time. An example of this is three different baseball games on three different channels. Another example includes rapidly switching between multiple channels at the top of the hour when the content is changing. A third example includes shifting to other channels when a commercial begins, and periodically hoping back to the original channel to see if the program has resumed.

Often viewers rapidly switch channels demonstrating a search pattern with a goal of finding something to watch other than commercials. With potentially hundreds of channels to browse through, the viewer may (at least initially) spend most of the time switching channels rather than viewing content of interest to the viewer.

DESCRIPTION OF DRAWINGS

An example embodiment of the present invention is illustrated by way of example and not limitation in the figures of the accompanying drawings, in which like references indicate similar elements and in which.

DETAILED DESCRIPTION

According to an aspect of the present subject matter there is provided a method and system of viewing a selection of thumbnails. A plurality of content channels, which are most recently tuned into by a user, are stored. Further, a display presents a selection array for a plurality of thumbnails that represent the plurality of content channels.

Other features of the present invention will be apparent from the accompanying drawings and from the detailed description which follows.

In the following description, for the purposes of explanation, numerous specific details are set forth in order to provide a thorough understanding of the disclosed embodiments. It will be apparent, however, to one skilled in the art that the disclosed embodiments may be practiced without some of these specific details. In other instances, well-known structures and devices are shown in block diagram form.

According to various embodiments, the devices described herein and below may be selected from a group including, but not limited to, a cable box, a satellite box, an electronic programming guide box, a set top box, a transmitter, a multifunctional device, a digital video recorder, a television, a video cassette recorder, a computer, a PC media player, a personal digital tunes player, a multifunctional device, or any other media device.

Example Internet Protocol Television System Environment

Figure 1:
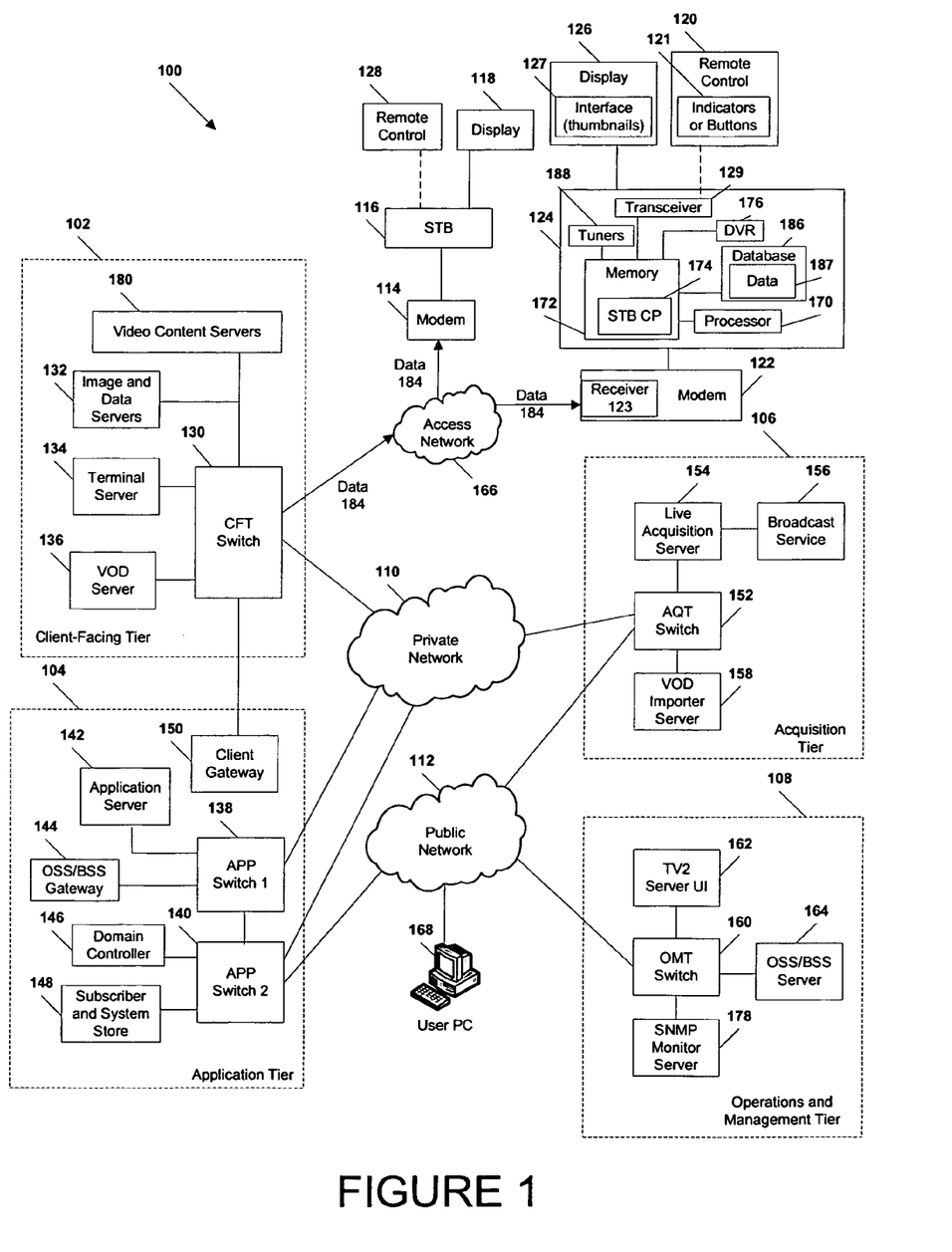
FIG. 1 illustrates an Internet Protocol Television (IPTV) system in which an embodiment may be implemented.

Referring to FIG. 1, an illustrative embodiment of an Internet Protocol Television (IPTV) system that may be used to provide video content is illustrated and is generally designated 100. As shown, the system 100 may include a client facing tier 102, an application tier 104, an acquisition tier 106, and an operations and management tier 108. Each tier 102, 104, 106, 108 is coupled to a private network 110; to a public network 112, such as the Internet; or to both the private network 110 and the public network 112. For example, the client-facing tier 102 may be coupled to the private network 110. Further, the application tier 104 may be coupled to the private network 110 and to the public network 112. The acquisition tier 106 may also be coupled to the private network 110 and to the public network 112. Additionally, the operations and management tier 108 may be coupled to the public network 112.

As illustrated in FIG. 1, the various tiers 102, 104, 106, 108 communicate with each other via the private network 110 and the public network 112. For instance, the client-facing tier 102 may communicate with the application tier 104 and the acquisition tier 106 via the private network 110. The application tier 104 may also communicate with the acquisition tier 106 via the private network 110. Further, the application tier 104 may communicate with the acquisition tier 106 and the operations and management tier 108 via the public network 112. Moreover, the acquisition tier 106 may communicate with the operations and management tier 108 via the public network 112. In a particular embodiment, elements of the application tier 104, including, but not limited to, a client gateway 150, may communicate directly with the client-facing tier 102.

As illustrated in FIG. 1, the client-facing tier 102 may communicate with user equipment via a private access network 166, such as an Internet Protocol Television (IPTV) access network. In an illustrative embodiment, modems, such as a first modem 114 and a second modem 122 may be coupled to the private access network 166. The client-facing tier 102 may communicate with a first representative set-top box device 116 via the first modem 114 and with a second representative set-top box device 124 via the second modem 122. Each modem 114, 122 may include a receiver, such as receiver 123 of modem 122, to receive the data 184, for instance. The client-facing tier 102 may communicate with a large number of set-top boxes, such as the representative set-top boxes 116, 124, over a wide geographic area, such as a regional area, a metropolitan area, a viewing area, a designated market area or any other suitable geographic area, market area, or subscriber or customer group that may be supported by networking the client-facing tier 102 to numerous set-top box devices. In an illustrative embodiment, the client-facing tier, or any portion thereof, may be included at a video head-end office.

In a particular embodiment, the client-facing tier 102 may be coupled to the modems 114, 122 via fiber optic cables. Alternatively, the modems 114 and 122 may be digital subscriber line (DSL) modems that are coupled to one or more network nodes via twisted pairs, and the client-facing tier 102 may be coupled to the network nodes via fiber-optic cables. Each set-top box device 116, 124 may process data received via the private access network 166, via an IPTV software platform, such as Microsoft® TV IPTV Edition.

Additionally, the first set-top box device 116 may be coupled to a first external display device 118, such as a first television monitor, and the second set-top box device 124 may be coupled to a second external display device 126, such as a second television monitor. The display 118 or 126 may illustrate an interface, for example, a selection list of video thumbnails 127, as described in more detail herein.

The first set-top box device 116 may communicate with a first remote control 128, and the second set-top box device 124 may communicate with a second remote control 120. The device 110 may include a wireless transmitter/receiver 129 to communicate with a wireless transmitter/receiver (not shown) of the remote control 120, for instance.

In an example, non-limiting embodiment, each set-top box device 116, 124 may receive data 184, which may include video content and/or audio content or portions, from the client-facing tier 102 via the private access network 166. The data 184 may be associated with at least one program, such as a broadcast program itself. The data 184 may include program content data associated with the at least one program.

The set-top boxes 116, 124 may transmit the content data of the data 184 to an external display device, such as the display devices 118, 126.

The set-top box devices 116, 124 may each include a STB processor, such as STB processor 170, and a STB memory device, such as STB memory 172, which is accessible to the STB processor 170. In one embodiment, a computer program, such as the STB computer program (STB CP) 174, may be embedded within the STB memory device 172. The memory 172 may be coupled with a database 186 of the device 116 or 124. The database 186 may include data 187, such as content channels most recently tuned into by a user. In an embodiment, the content channels may include broadcast channels.

In an additional embodiment, the content channels may include broadband channels, such as high-speed, high-capacity data transmission channels that send and receive information on cable. The cable, which may be coaxial cable or fiber-optic cable, may have a wider bandwidth than conventional telephone lines, and may have the ability to carry video, voice, and data simultaneously.

The plurality of video thumbnails may include a plurality of video thumbnails presented in substantial real time with corresponding broadcasts. The plurality of video thumbnails may include a plurality of live broadcast video thumbnails. The plurality of video thumbnails may include a plurality of still thumbnails, for example each still thumbnail may include a picture frame representing a corresponding video thumbnail. The plurality of video thumbnails may include a plurality of recorded video thumbnails. The plurality of recorded video thumbnails may include recordings from a digital video recorder.

The plurality of video thumbnails may include a plurality of reduced size video images. The device 116, 124 may further include a plurality of tuners 188, for example, one tuner for each of the video thumbnails 127 displayed simultaneously on the display 118 or 126.

Each set-top box device 116, 124 may also include a video content storage module, such as a digital video recorder (DVR) 176. In a particular embodiment, the set-top box devices 116, 124 may communicate commands received from the remote control devices 120, 128 to the client-facing tier 102 via the private access network 166. The commands received from the remote control devices 120, 128 may be entered via indicators (or buttons) 121. The commands received may include a selection of one of the thumbnails 127 on the display 118 or 126, for instance.

In an illustrative embodiment, the client-facing tier 102 may include a client-facing tier (CFT) switch 130 that manages communication between the client-facing tier 102 and the private access network 166 and between the client-facing tier 102 and the private network 110. As shown, the CFT switch 130 is coupled to one or more image and data servers 132 that store still images associated with programs of various IPTV channels. The image and data servers 132 may also store data related to various channels, e.g., types of data related to the channels and to programs or video content displayed via the channels. In an illustrative embodiment, the image and data servers 132 may be a cluster of servers, each of which may store still images, channel and program-related data, or any combination thereof. The CFT switch 130 may also be coupled to a terminal server 134 that provides terminal devices with a connection point to the private network 110. In a particular embodiment, the CFT switch 130 may also be coupled to a video-on-demand (VOD) server 136 that stores or provides VOD content imported by the IPTV system 100. The client-facing tier 102 may also include one or more video content servers 180 that transmit video content requested by viewers via their set-top boxes 116, 124. In an illustrative, non-limiting embodiment, the video content servers 180 may include one or more multicast servers.

As illustrated in FIG. 1, the application tier 104 may communicate with both the private network 110 and the public network 112. The application tier 104 may include a first application tier (APP) switch 138 and a second APP switch 140. In a particular embodiment, the first APP switch 138 may be coupled to the second APP switch 140. The first APP switch 138 may be coupled to an application server 142 and to an OSS/BSS gateway 144. In a particular embodiment, the application server 142 may provide applications to the set-top box devices 116, 124 via the private access network 166, which enable the set-top box devices 116, 124 to provide functions, such as display, messaging, processing of IPTV data and VOD material, etc. In a particular embodiment, the OSS/BSS gateway 144 includes operation systems and support (OSS) data, as well as billing systems and support (BSS) data. In one embodiment, the OSS/BSS gateway 144 may provide or restrict access to an OSS/BSS server 164 that stores operations and billing systems data.

Further, the second APP switch 140 may be coupled to a domain controller 146 that provides web access, for example, to users via the public network 112. For example, the domain controller 146 may provide remote web access to IPTV account information via the public network 112, which users may access using their personal computers 168. The second APP switch 140 may be coupled to a subscriber and system store 148 that includes account information, such as account information that is associated with users who access the system 100 via the private network 110 or the public network 112. In a particular embodiment, the application tier 104 may also include a client gateway 150 that communicates data directly with the client-facing tier 102. In this embodiment, the client gateway 150 may be coupled directly to the CFT switch 130. The client gateway 150 may provide user access to the private network 110 and the tiers coupled thereto.

In a particular embodiment, the set-top box devices 116, 124 may access the IPTV system 100 via the private access network 166, using information received from the client gateway 150. In this embodiment, the private access network 166 may provide security for the private network 110. User devices may access the client gateway 150 via the private access network 166, and the client gateway 150 may allow such devices to access the private network 110 once the devices are authenticated or verified. Similarly, the client gateway 150 may prevent unauthorized devices, such as hacker computers or stolen set-top box devices from accessing the private network 110, by denying access to these devices beyond the private access network 166.

For example, when the first representative set-top box device 116 accesses the system 100 via the private access network 166, the client gateway 150 may verify subscriber information by communicating with the subscriber and system store 148 via the private network 110, the first APP switch 138, and the second APP switch 140. Further, the client gateway 150 may verify billing information and status by communicating with the OSS/BSS gateway 144 via the private network 110 and the first APP switch 138. In one embodiment, the OSS/BSS gateway 144 may transmit a query across the first APP switch 138, to the second APP switch 140, and the second APP switch 140 may communicate the query across the public network 112 to the OSS/BSS server 164. After the client gateway 150 confirms subscriber and/or billing information, the client gateway 150 may allow the set-top box device 116 access to IPTV content and VOD content. If the client gateway 150 cannot verify subscriber information for the set-top box device 116, e.g., because it is connected to an unauthorized twisted pair, the client gateway 150 may block transmissions to and from the set-top box device 116 beyond the private access network 166.

As indicated in FIG. 1, the acquisition tier 106 includes an acquisition tier (AQT) switch 152 that communicates with the private network 110. The AQT switch 152 may also communicate with the operations and management tier 108 via the public network 112. In a particular embodiment, the AQT switch 152 may be coupled to a live acquisition server 154 that receives television or movie content, for example, from a broadcast service 156. In a particular embodiment during operation of the IPTV system, the live acquisition server 154 may acquire television or movie content. The live acquisition server 154 may transmit the television or movie content to the AQT switch 152, and the AQT switch 152 may transmit the television or movie content to the CFT switch 130 via the private network 110.

Further, the television or movie content may be transmitted to the video content servers 180, where it may be encoded, formatted, stored, or otherwise manipulated and prepared for communication to the set-top box devices 116, 124. The CFT switch 130 may communicate the television or movie content to the modems 114, 122 via the private access network 166. The set-top box devices 116, 124 may receive the television or movie content via the modems 114, 122, and may transmit the television or movie content to the display devices 118, 126. In an illustrative embodiment, video or audio portions of the television or movie content may be streamed to the set-top box devices 116, 124.

Further, the AQT switch may be coupled to a video-on-demand importer server 158 that stores television or movie content received at the acquisition tier 106 and communicates the stored content to the VOD server 136 at the client-facing tier 102 via the private network 110. Additionally, at the acquisition tier 106, the video-on-demand (VOD) importer server 158 may receive content from one or more VOD sources outside the IPTV system 100, such as movie studios and programmers of non-live content. The VOD importer server 158 may transmit the VOD content to the AQT switch 152, and the AQT switch 152, in turn, may communicate the material to the CFT switch 130 via the private network 110. The VOD content may be stored at one or more servers, such as the VOD server 136.

When user issue requests for VOD content via the set-top box devices 116, 124, the requests may be transmitted over the private access network 166 to the VOD server 136, via the CFT switch 130. Upon receiving such requests, the VOD server 136 may retrieve the requested VOD content and transmit the content to the set-top box devices 116, 124 across the private access network 166, via the CFT switch 130. The set-top box devices 116, 124 may transmit the VOD content to the display devices 118, 126. In an illustrative embodiment, video or audio portions of VOD content may be streamed to the set-top box devices 116, 124.

FIG. 1 further illustrates that the operations and management tier 108 may include an operations and management tier (OMT) switch 160 that conducts communication between the operations and management tier 108 and the public network 112. In the embodiment illustrated by FIG. 1, the OMT switch 160 is coupled to a TV2 server 162. Additionally, the OMT switch 160 may be coupled to an OSS/BSS server 164 and to a simple network management protocol (SNMP) monitor server 178 that monitors network devices within or coupled to the IPTV system 100. In a particular embodiment, the OMT switch 160 may communicate with the AQT switch 152 via the public network 112.

In an illustrative embodiment, the live acquisition server 154 may transmit the television or movie content to the AQT switch 152, and the AQT switch 152, in turn, may transmit the television or movie content to the OMT switch 160 via the public network 112. In this embodiment, the OMT switch 160 may transmit the television or movie content to the TV2 server 162 for display to users accessing the user interface at the TV2 server 162. For example, a user may access the TV2 server 162 using a personal computer (PC) 168 coupled to the public network 112.

Example Database

Figure 2:
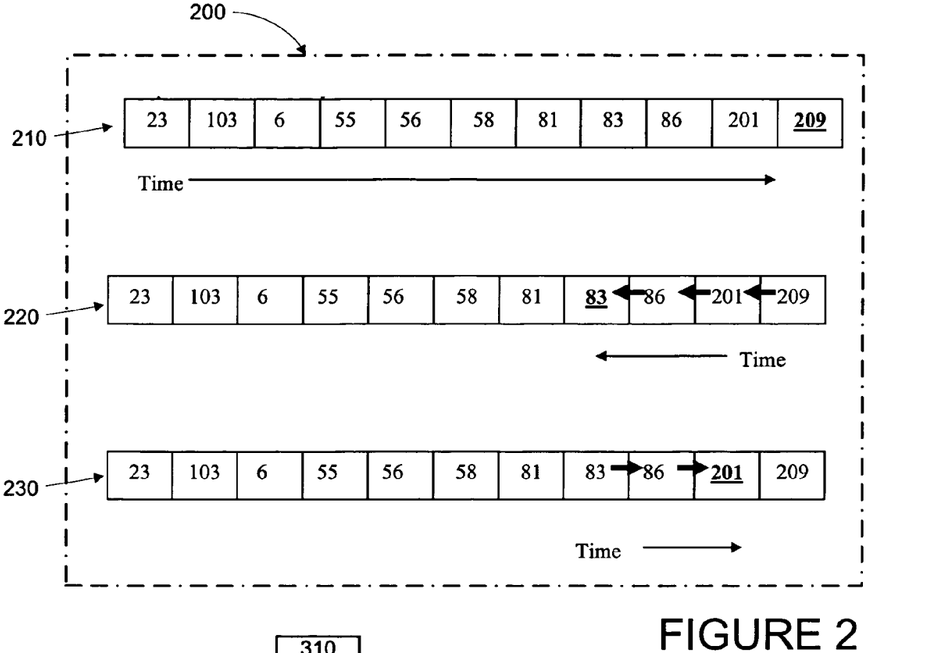
FIG. 2 illustrates example channel history stored on a database according to an embodiment.

FIG. 2 illustrates example channel history data 200 stored on the database 186 according to an embodiment.

As shown in a channel history lineup 210, at an initial time, a first broadcast channel, channel 23 for example, may be tuned into. The database 186 stores this channel history data. Subsequent broadcast channels may be tuned into, for example, channel 103, channel 6, channel 55, channel 56, channels 58, 81, 83, 86, 201 and finally channel 209. The database 186 again stores this channel history data. The channels may be stored and/or presented in sequential order of most recently tuned-into broadcast channels. As each new channel is tuned into, it may be added to the database, in sequential order, for instance.

As shown in a channel history lineup 220 at a time subsequent to the lineup 210, a user opts to view a channel previously viewed several channels back in time. The user may go "back" through the channels they have previously viewed in much the same way as a web browser allows navigation of web pages. Each time the user goes "back" another channel, a previously viewed channel is displayed on the display 118 or 126, until the destination channel is found. In the illustration, the viewer goes "back" to channel 83.

As shown in a channel history lineup 230 at a time subsequent to the lineup 220, a user opts to view a channel previously viewed several channels back in time. The user may go "backward" or "forward" through the channels they have previously viewed in much the same way as a web browser allows navigation of web pages. Each time the user goes "forward" another channel, a previously viewed channel is displayed on the display 118 or 126, until the destination channel is found. In this illustration, the viewer goes "forward" to channel 201.

In an embodiment, the entire channel line-up 210 is displayed on the display so that the user need not try to remember if the previously viewed channel was "back" or "forward" with respect to the current channel. The current channel being viewed may be highlighted, as shown in line up 210, for example, channel 209. In the instance where at the end of the channel line-up, for instance channel 209, the user goes "forward" to another channel, the channel to be viewed may be the one at the beginning of the line-up, for example, channel 23. Likewise, from the initial channel, channel 23, the user may go "back" to channel 209, the last channel in the line up.

In embodiments, the broadcast channels most recently tuned into by the user (e.g., the channel line-up 210) exclusively includes broadcast channels viewed for a minimum pre-determined duration or a minimum dwell duration. For example, the user has viewed each of these channels for at least 10 seconds.

In some instances, a selected maximum number of previously viewed channels are included in the line-up. For example, a maximum of 20 channels are included in the line-up 210.

Figure 4:
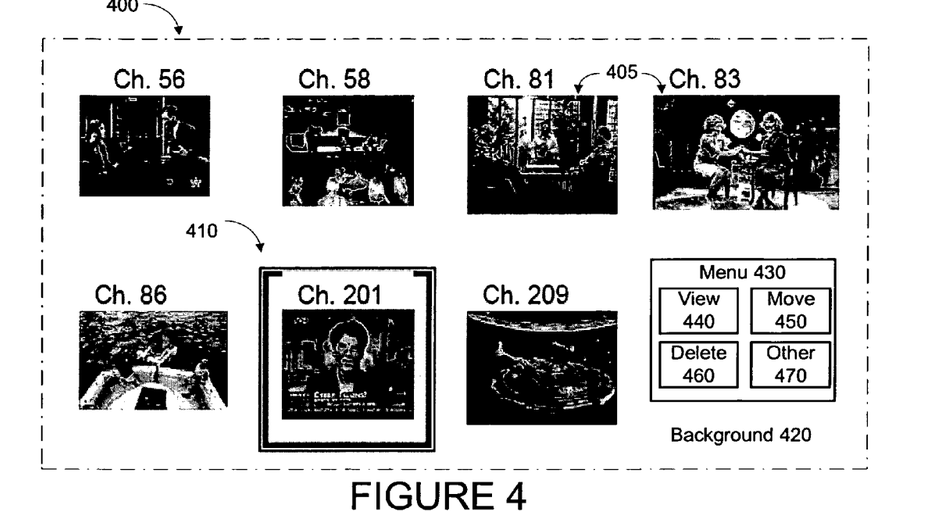
FIG. 4 illustrates an interface according to an embodiment.
Figure 5:
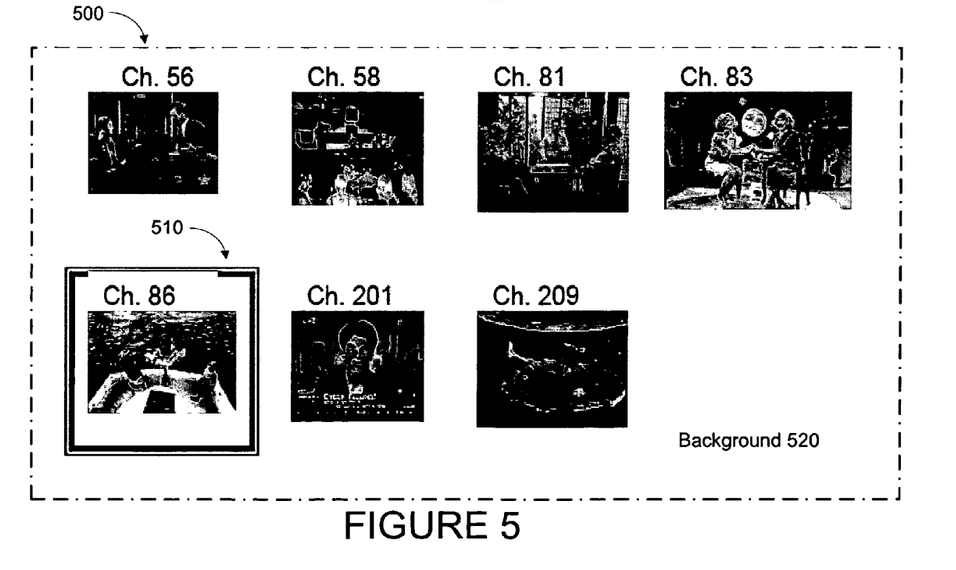
FIG. 5 illustrates an interface according to another embodiment.

In another embodiment, shown in FIGS. 4 and 5, the "line-up" of channels includes thumbnails 127 of video broadcasts displayed on the display. In some embodiments, the thumbnails may be live video broadcasts, and in others, the thumbnails may be a still view of the broadcast and/or a recent snapshot of the broadcast.

Example Input Device

Figure 3:
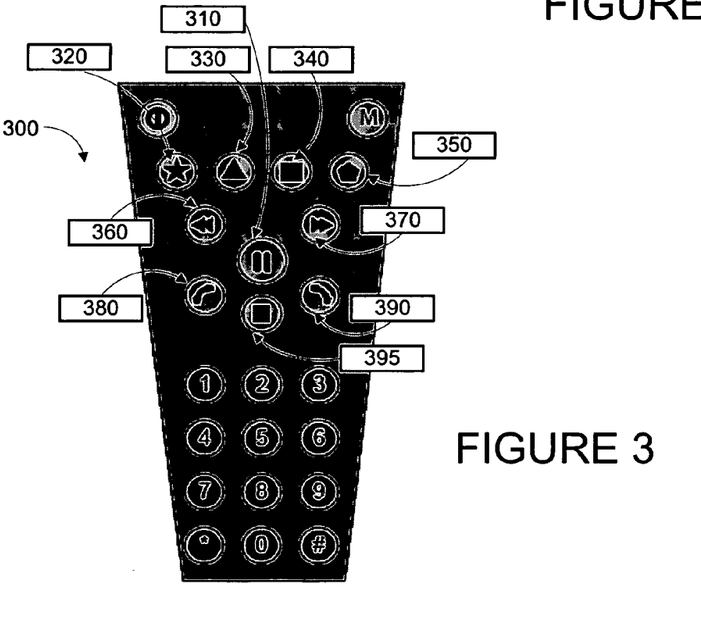
FIG. 3 illustrates an input device according to an embodiment.

FIG. 3 illustrates an input device 300 according to an embodiment. The input device 300 may be the input device 120 of FIG. 1. The indicators 121 of FIG. 1 may include a button, a knob, or a wheel of the input device, and also may include a voice command receiver and indicators to respond to an on-screen menu 430 (see FIG. 4).

In the embodiment shown, the indicators 121 may specifically include a "history" button 310, a "select" button 320, a "move" button 330, a "delete" or erase button 340, an "other" button 350 for other functions related to the thumbnails or display, a "backward" or left-ward button 360, a "forward" or right-ward button 370, an "upward" button 380 (to maneuver up in an array, for instance), and a "downward" button 390. The buttons 310-390 may be arranged in any of a variety of ways, for example, placing the upward button 380 directly above the downward button 390.

The "select" button 320 may be used to request a channel to be viewed on the full display to the exclusion of other icons, menus, thumbnails, line-ups and/or other items. Button 320 may additionally be considered an "Enter" button or an "OK" button. Either thumbnails 127 or channels of the line-up 210 may be navigated through use of the directional controls 360, 370, 380, 390 of the input device 300.

The input device may additionally have a mode dependent function, for example, activating button 395, to use existing keys for these same described functions in this alternative mode.

Example Interfaces

FIG. 4 illustrates an interface 400 according to an embodiment. The interface 400 may include a plurality of video thumbnails 405 (live or still) and may be presented in sequential order of most recently tuned-into broadcast channels. The thumbnails 405 may be presented in a straight line, or in an array (as shown) or in any other convenient presentation. The number of thumbnails may correspond to the number of tuners 188 present in the device 110.

In this example, the thumbnail of channel 201 is selected as a highlighted thumbnail 410. This thumbnail may be selected using the navigation controls of the input device, for instance.

The interface 400 may include a background 420 with a live broadcast, not shown. The live broadcast in the background may or may not be the same channel as one of the thumbnails 405. The background broadcast may be switchable to other channels using a channel up/down button, for instance, or to one of the thumbnails 405 using button 350 of the input device, for instance.

Thumbnails of video broadcasts (live or still shots) may be presented on the interface 400 after selecting the "history" button 310 of the input device to indicate a selection of an option to view the channel history in thumbnail format. The display including the interface 400 may then be as shown in FIG. 4, for instance.

Buttons 360, 370, 380 and 390 of the input device 300 may be used to navigate through the selection list of the plurality of video thumbnails 405 (live or still) on the display including the interface 400 shown in FIG. 4. As each thumbnail is selected, the thumbnail may be highlighted as shown in FIG. 4 at 410.

The select button 320 of the input device 300 may be used to select the thumbnail 410 to view the associated program content to the exclusion of the other thumbnails 405. Alternatively, the user may use navigation buttons on the input device to select a View icon 440 of an on-screen menu 430, as shown in FIG. 4.

The move button 330 of the input device 300 may be used to select the thumbnail 410 to move relative to other thumbnails 405 on the display including the interface 400. In this way, the user may have the option of grouping together certain channels or just setting up a preferred channel order. Alternatively, the user may use navigation buttons on the input device to select a Move icon 450 of the on-screen menu 430, as shown in FIG. 4.

The delete button 340 of the input device 300 may be used to select the thumbnail 410 to erase from the interface 400. Alternatively, the user may use navigation buttons on the input device to select a Delete icon 460 of the on-screen menu 430, as shown in FIG. 4.

The "other" button 350 of the input device 300 may be used to select the thumbnail 410 to display the representative channel in the background 420 of the interface 400, for instance. Alternatively, the user may use navigation buttons on the input device to select an Other icon 470 of the on-screen menu 430, as shown in FIG. 4.

FIG. 5 illustrates an interface 500 according to another embodiment. In this interface, the thumbnail of channel 86 is selected as a highlighted thumbnail 510. The thumbnail 510 may have been highlighted by using the "back" button 360 of the input device from the embodiment shown in FIG. 4 where the thumbnail of channel 201 was the highlighted thumbnail 410.

In this embodiment, a background 520 of the interface 500 may be blank, for instance a solid blue color.

Flow Chart

Figure 7:
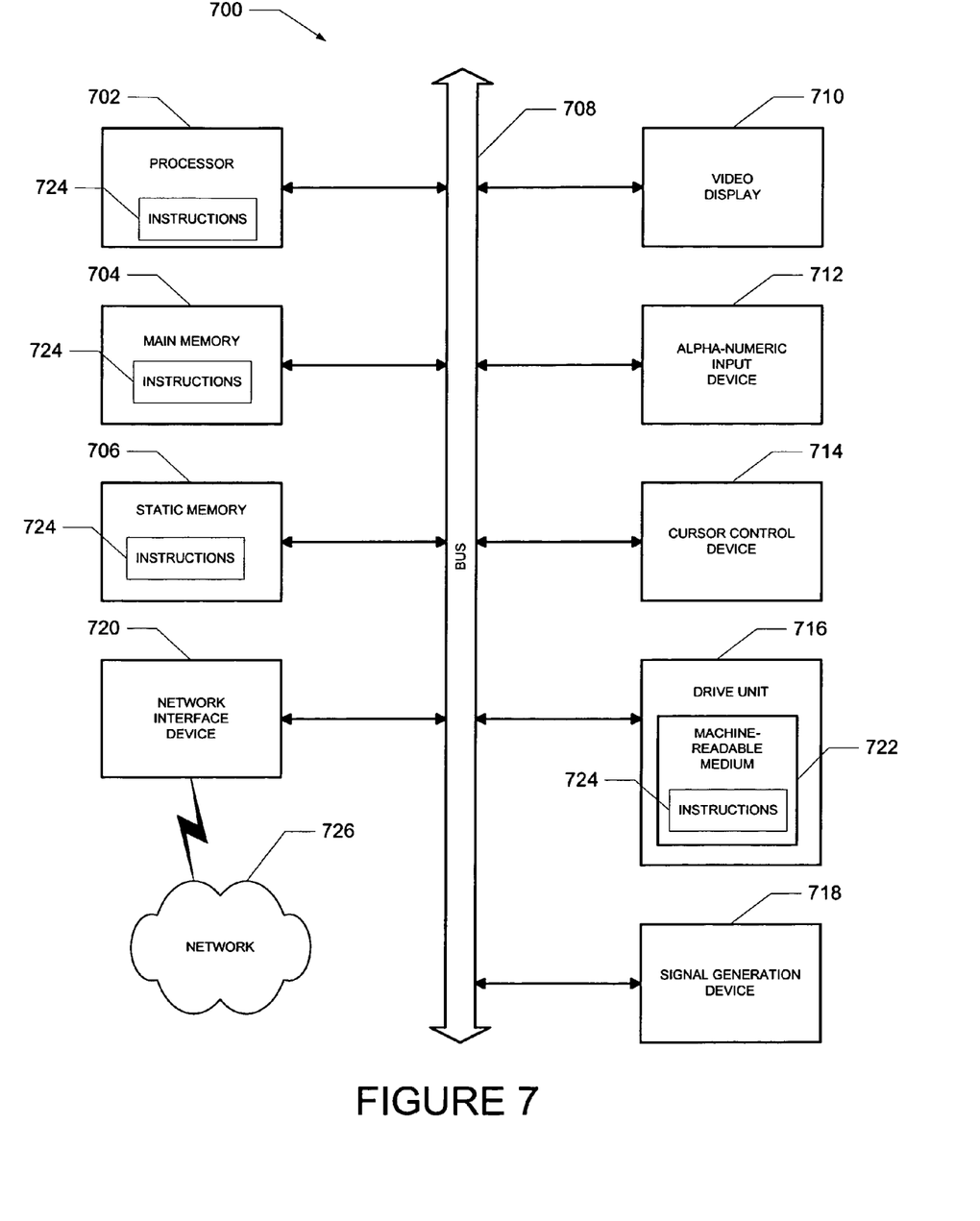
FIG. 7 shows a diagrammatic representation of machine in the example form of a computer system within which a set of instructions, for causing the machine to perform any one or more of the methodologies discussed herein, may be executed.

The processing described below may be performed under the control of a programmed processor, such as processor 702, or the logic may be implemented and distributed among hardware, firmware, software, or a combination thereof within the device 110, for example.

Figure 6:
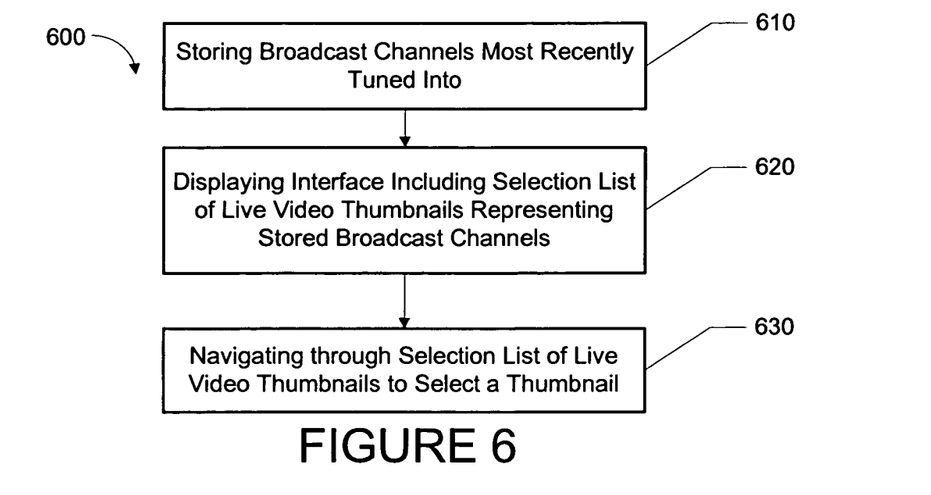
FIG. 6 illustrates a flow chart of viewing a selection of thumbnails according to an embodiment.

FIG. 6 illustrates a flow chart of a method 600 of viewing a selection of thumbnails according to an embodiment.

At block 610, a plurality of broadcast channels most recently tuned into by a user may be stored on the database 186.

At block 620, an interface (400, 500) including a selection list of a plurality of video thumbnails (127, 405) representing the plurality of broadcast channels, respectively, may be displayed on the display (118 or 126).

At block 630, the selection list of the plurality of video thumbnails on the display may be navigated through to select the thumbnail (410, 510) using the input device (120, 128, 300).

Means for storing a plurality of broadcast channels most recently tuned into by a user may include the database 186. Means for displaying an interface including a selection list of a plurality of live video thumbnails representing the plurality of broadcast channels, respectively may include the display 118, 126 and may specifically include the interface (thumbnails) 127. Means for navigating through the selection list of the plurality of live video thumbnails to select a thumbnail of the plurality of live video thumbnails may include the remote control 120, 128.

Computer Architecture

FIG. 7 shows a diagrammatic representation of a machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a digital video recorder (DVR), a personal computer (PC), a tablet PC, a set-top box (STB), a cable box, a satellite box, an electronic programming guide box, a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The main memory 704 and/or the static memory 706 may be used to store the channel history data.

The computer system 700 may further include a video display unit 710 (e.g., a television, a liquid crystal display (LCD) or a cathode ray tube (CRT)) on which to display broadcast or other programs, for example. The computer system 700 also includes an alphanumeric input device 712 (e.g., a keyboard or a remote control), a user interface (UI) navigation device 714 (e.g., a remote control, or a mouse), a disk drive unit 716, a signal generation device 718 (e.g., a speaker) and a network interface device 720.

The input device 712 and/or the navigation device 714 (e.g., the remote control) may include a processor (not shown), and a memory (not shown).

The disk drive unit 716 includes a machine-readable medium 722 on which is stored one or more sets of instructions and data structures (e.g., software 724) embodying or utilized by any one or more of the methodologies or functions described herein (e.g., the software to access the channel history data in the database 186). The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 (e.g., a television cable provider) via the network interface device 720 utilizing any one of a number of well-known transfer protocols (e.g., broadcast transmissions, HTTP).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A device, comprising:
a memory to store instructions; and
a processor coupled to the memory, wherein responsive to executing the instructions, the processor performs operations comprising:
storing in the memory a listing of a plurality of recently presented content channels, wherein the listing is limited to a predetermined maximum number of recently presented content channels;
determining whether each channel of the listing was presented for display by the device for at least a minimum time duration to a user;
removing respective channels from the listing if the respective channel was determined to not be displayed for the minimum time duration;
retrieving from the memory the listing of the plurality of recently presented content channels;
tuning a plurality of live broadcasts from an interactive television network broadcast stream by way of a plurality of tuners of the device, wherein the plurality of live broadcasts corresponds to the listing of the plurality of recently presented content channels, wherein the plurality of tuners are all physically present in the device;

presenting simultaneously for display, a plurality of video thumbnails, wherein the plurality of video thumbnails is arranged in a time-ordered sequence of recent presentation according to the listing of the plurality of recently presented content channels, wherein each thumbnail of the plurality of video thumbnails is a same size, wherein the plurality of video thumbnails have a one-to-one correspondence with the plurality of tuners of the device;

receiving a selection command from a remote control device to choose a selected video thumbnail of the plurality of video thumbnails, wherein the selected video thumbnail is presented at a first location on the display;

receiving a move command from the remote control device to move among the plurality of thumbnails, wherein individual video thumbnails are highlighted according to the move command;

presenting for display the plurality of live broadcasts, wherein each of the plurality of live broadcasts is displayed within a corresponding one of the plurality of video thumbnails;

displaying a background presentation of a live broadcast, wherein the plurality of video thumbnails are presented in a foreground, and wherein the background presentation is of broadcast content from a broadcast channel that is not included in the listing of the plurality of recently presented content channels;

receiving a display command from the remote control device to display the highlighted thumbnail as the channel to be displayed in the background; and deleting the selected video thumbnail from the display upon receiving a delete command from the remote control device.

2. The device of claim 1, wherein the listing of the plurality of recently presented content channels comprises a broadband channel, and wherein the plurality of video thumbnails are presented without presenting any still images of the plurality of live broadcasts.

3. The device of claim 1, wherein the plurality of video thumbnails comprises a still image thumbnail.

4. The device of claim 1, wherein the plurality of video thumbnails comprises a recorded video thumbnail.

5. The device of claim 4, wherein the recorded video thumbnail comprises a recording from a digital video recorder in communication with the device.

6. The device of claim 1, wherein the plurality of video thumbnails comprises a plurality of reduced size video images.

7. The device of claim 1, wherein the minimum time duration is at least ten seconds.

8. The device of claim 1, wherein the operations further comprise:
selecting one of the plurality of video thumbnails; and
exclusively presenting for display the one of the plurality of video thumbnails.

9. The device of claim 1, wherein the plurality of video thumbnails are presented in a linear array.

10. The device of claim 1, wherein the operations further comprise:
navigating through the plurality of video thumbnails on the display; and
selecting one of the plurality of video thumbnails.

11. The device of claim 10, wherein the operations further comprise, exclusively displaying for viewing one of the plurality of live broadcasts in response to the selecting of the one of the plurality of video thumbnails.

12. A method, comprising:
storing, by a system including a set-top box comprising a processor, a listing of recently presented content channels, wherein each channel of the listing of recently presented content channels was presented for display by a display device for at least a minimum time duration, wherein the display device is connected to the set-top box;

retrieving, by the system, the listing of recently presented content channels, wherein the listing is limited to a predetermined maximum number of recently presented content channels;

determining whether each channel of the listing was presented for display by the device for at least a minimum time duration to a user;

removing respective channels from the listing if the respective channel was determined to not be displayed for the minimum time duration;

tuning, by the system, a plurality of live broadcasts from an interactive television network broadcast stream by way of a plurality of tuners, wherein the plurality of live broadcasts correspond to the listing of recently presented content channels, wherein the plurality of tuners are all physically present in the set-top box; and presenting simultaneously, by the system, a selection array of a plurality of video thumbnails on the display device, wherein each of the plurality of video thumbnails frames one of the plurality of live broadcasts corresponding to one of the listing of recently presented content channels, and wherein the selection array is presented as a linear array that is arranged in a time-ordered sequence of recent presentation, and wherein there is a one-to-one correspondence between the plurality of video thumbnails and the plurality of tuners of the processor;

receiving, by the system, a selection command input from a remote control device to choose a selected video thumbnail of the plurality of video thumbnails, wherein the selected video thumbnail is presented at a first location on the display device;

receiving, by the system, a move command input from the remote control device to move the selected video thumbnail to a second location on the display device;

presenting, by the system, the selected video thumbnail at the second location on the display device;

displaying, by the system, a video background with the selection array of the plurality of video thumbnails, wherein the plurality of video thumbnails includes a still image representative of a first channel of the listing of recently presented content channels, moving images presented by a second channel of the listing of recently presented content channels, and another still image obtained from images presented by a third channel of the listing of recently presented content channels;

receiving a display command from the remote control device to display a selected channel to be displayed in the background; and deleting the selected video thumbnail from the display upon receiving a delete command from the remote control device.

13. The method of claim 12, wherein the minimum time duration is at least ten seconds.

14. The method of claim 12, comprising presenting, by the system, for exclusive viewing on the display device one of the listing of recently presented content channels, wherein the plurality of video thumbnails are presented without presenting any still images of the plurality of live broadcasts.

15. The method of claim 12, comprising navigating, by the system, through the selection array of the plurality of video thumbnails to select one of the plurality of video thumbnails using an input device.

16. The method of claim 15, further comprising presenting, by the system, for exclusive viewing on the display device one of the listing of recently presented content channels associated with the selected one of the plurality of video thumbnails.

17. A device, comprising:
  a memory to store instructions; and
  a processor coupled to the memory, wherein responsive to executing the instructions, the processor performs operations comprising:
    storing in the memory a listing of recently presented content channels, wherein the listing is limited to a predetermined maximum number of recently presented content channels;
    determining whether each channel of the listing was presented for display by a display device for at least a minimum time duration to a user;
    removing respective channels from the listing if the respective channel was determined to not be displayed for the minimum time duration;
    retrieving from the memory the listing of recently presented content channels;
    presenting simultaneously for display a plurality of video thumbnails each framing one of a plurality of live broadcasts corresponding to the listing of recently presented content channels, wherein the plurality of live broadcasts are tuned from an interactive television network broadcast stream by way of a plurality of tuners of the device, wherein the plurality of tuners are all physically present in the device, wherein the plurality of video thumbnails is arranged in a time-ordered sequence of recent presentation according to the listing of recently presented content channels, and wherein the plurality of video thumbnails is presented in a linear array;
    presenting for display a menu comprising navigation buttons operable to select one of the plurality of video thumbnails;
    receiving a selection command from a remote control device to choose a selected video thumbnail of the plurality of video thumbnails, wherein the selected video thumbnail is presented at a first location on the display device;
    receiving a move command from the remote control device to move the selected video thumbnail to a second location on the display device; and
    presenting the selected video thumbnail at the second location on the display device, wherein each of the plurality of live broadcasts is displayed within a corresponding one of the plurality of video thumbnails;
    displaying a background presentation of a live broadcast, wherein the plurality of video thumbnails are presented in a foreground, and wherein the background presentation is of broadcast content from a broadcast channel that is not included in the listing of the listing of recently presented content channels;
    receiving a display command from the remote control device to display a selected channel to be displayed in the background; and
    deleting the selected video thumbnail from the display upon receiving a delete command from the remote control device.

18. A machine-readable storage device, comprising computer instructions which, responsive to being executed by a processor, cause the processor to perform operations comprising:
  storing a listing of recently presented content channels, wherein the listing is limited to a predetermined maximum number of recently presented content channels;
  determining whether each channel of the listing was presented for display by a display device for at least a minimum time duration to a user;
  removing respective channels from the listing if the respective channel was determined to not be displayed for the minimum time duration;
  retrieving the listing of the recently presented content channels;
  tuning a plurality of live broadcasts from an interactive television network broadcast stream by way of a plurality of tuners of a set-top box connected to the display device, wherein the plurality of live broadcasts correspond to the listing of recently presented content channels, wherein the plurality of tuners are all physically present in the set-top box; and
  presenting simultaneously for display a plurality of video thumbnails each framing one of the plurality of live broadcasts of one of the listing of recently presented content channels, wherein the plurality of video thumbnails are presented without presenting any still images of the plurality of live broadcasts, wherein the plurality of video thumbnails is arranged in a time-ordered sequence of recent presentation according to the listing of recently presented content channels, wherein each thumbnail of the plurality of video thumbnails is a same size, and wherein there is a one-to-one correspondence between the plurality of video thumbnails and the plurality of tuners of the device;
  receiving a selection command from a remote control device to choose a selected video thumbnail of the plurality of video thumbnails, wherein the selected video thumbnail is presented at a first location for display device;
  receiving a move command from the remote control device to move the selected video thumbnail to a second location;
  displaying a background presentation of a live broadcast, wherein the plurality of video thumbnails are presented in a foreground, and wherein the background presentation is of broadcast content from a broadcast channel that is not included in the listing of the listing of recently presented content channels;
  receiving a display command from the remote control device to display the selected video thumbnail to be displayed in the background; and
  deleting the selected video thumbnail from the display upon receiving a delete command from the remote control device.

* * * * *